(12) United States Patent
Venere et al.

(10) Patent No.: US 7,794,642 B2
(45) Date of Patent: Sep. 14, 2010

(54) PROCESS AND MOLD FOR MOLDING STRUCTURED SHEETS

(75) Inventors: Giorgio Venere, Via Roma (IT); Adriano Odino, Angrogna (IT)

(73) Assignee: Renolit Gor S.p.A., Burlasco (TO) (IT)

( * ) Notice: Subject to any disclaimer, the term of this patent is extended or adjusted under 35 U.S.C. 154(b) by 54 days.

(21) Appl. No.: 11/914,134

(22) PCT Filed: May 18, 2006

(86) PCT No.: PCT/EP2006/004712
§ 371 (c)(1),
(2), (4) Date: Jan. 5, 2008

(87) PCT Pub. No.: WO2006/122801
PCT Pub. Date: Nov. 23, 2006

(65) Prior Publication Data
US 2008/0246184 A1  Oct. 9, 2008

(30) Foreign Application Priority Data
May 20, 2005 (FR) .................................. 05 05111

(51) Int. Cl.
B29C 59/02 (2006.01)
B29C 51/08 (2006.01)
(52) U.S. Cl. ....................................... 264/320; 425/111
(58) Field of Classification Search ................ 264/320; 425/395, 397, 398, 400
See application file for complete search history.

(56) References Cited

U.S. PATENT DOCUMENTS

| 4,390,489 | A | * | 6/1983 | Segal | 264/126 |
| 4,961,700 | A | * | 10/1990 | Dunbar | 425/394 |
| 6,471,902 | B1 | * | 10/2002 | Snyder | 264/294 |
| 7,316,847 | B2 | * | 1/2008 | MacNeil | 428/515 |

FOREIGN PATENT DOCUMENTS

| GB | 901184 | 7/1962 |
| JP | 9174566 | 4/1999 |
| WO | 99/17914 | 4/1999 |

OTHER PUBLICATIONS

European Patent Office, Communication Pursuant to Article 94(3) EPC, May 27, 2008.
European Patent Office, Communication Pursuant to Article 94(3) EPC, Mar. 24, 2009.
European Patent Office, Notice of Allowance and Allowed Claims in Application EP 06753703.5, Feb. 5, 2010.

* cited by examiner

Primary Examiner—Kat Wyrozebski
Assistant Examiner—Robert J Grun
(74) Attorney, Agent, or Firm—Themis Law

(57) ABSTRACT

Process for molding sheets possessing, locally, a three-dimensional projecting or recessed structure, in which a blank sheet is placed between the two parts of a mold, the surface of which corresponds to the negative of said three-dimensional structure. At least one portion of the surface of the mould surrounding said negative possesses a feature intended to form a local reservoir able to supply or receive material of the three-dimensional structure depending on whether it is projecting or recessed, respectively.

8 Claims, 5 Drawing Sheets

PROCESS AND MOLD FOR MOLDING STRUCTURED SHEETS

The invention relates to a process and to a mould for moulding structured sheets. The term "structured sheet" is understood to mean a part that essentially has two dimensions, and therefore can result from the continuous deformation of a plane part, possessing a thickness substantially smaller (by at least 100 times) than its width and length, but which includes several appendages having a three-dimensional structure. These may for example be fastening ribs or systems, moulded as one part with the sheet. The interior lining of motor vehicles frequently includes such structured sheets, which are made of thermoplastic material.

A known means of producing such structured sheets is the moulding of a molten material in a mould. Examples of any injection moulding of plastics and the casting of aluminium are well known. In the plastics injection moulding process, plastic is heated and mixed in a feed screw and stored in an accumulator. When the latter is full, its content is injected into a temperature-conditioned closed mould where the material is cooled. When the latter has reached a sufficiently low temperature to have a suitable mechanical strength, the mould is opened and the part ejected. However, in particular when the structured sheets are thin, the injection of molten material requires high pressures and therefore heavy and expensive machines.

It is also known to combine compression moulding with injection moulding, such as for example described in EP 1 153 725. In such a process, the two-dimensional part is moulded by compression moulding while the three-dimensional parts are injection moulded. However, an injection moulding machine and a mould capable of withstanding high pressures are still necessary, thereby increasing the cost of the process.

The object of the invention is to provide a simplified process for producing low-cost structured sheets.

Consequently, the invention relates to a process for moulding sheets possessing, locally, a three-dimensional projecting or recessed structure, in which a blank sheet is placed between the two parts of a mould, the surface of which corresponds to the negative of said three-dimensional structure, and the mould is closed in order to compress the blank sheet and force it to flow into the three-dimensional structure. According to the invention, at least one portion of the surface of the mould surrounding said negative possesses a projecting or recessed feature intended respectively to expel or receive material of the three-dimensional structure depending on whether it is projecting or recessed, respectively.

The expression "projecting three-dimensional structure" is understood to mean any appendage or accessory, made of the same material as the sheet, which it is desired to be integral with this sheet. Typically, these are stiffening ribs or, for example, fastening systems. They may also be overthicknesses intended to reduce the moulding pressure. A recessed structure is a recess made in the sheet during moulding, allowing any useful accessory to be subsequently introduced into it.

It has been observed that the presence of such features, constituting small "reservoirs", limits the length of the paths that the material must follow during moulding, and therefore reduces the moulding pressure. This results in a lower mould-clamping force, and therefore lighter and less expensive machines. Moreover, when the three-dimensional structure is projecting, better filling of the negative is obtained. When the structure is recessed, uncontrolled overthicknesses or surface flaws ("sink marks") are avoided.

In a first preferred version of the process according to the invention, the three-dimensional structure is projecting and the feature of the mould is a protuberance intended to locally reduce the space provided between the two parts of the mould when it is closed, in order to force the material to penetrate into the negative and to form the three-dimensional structure. The structured sheet will therefore be slightly thinner around the structure. The thickness and the area of the protuberance depend on the volume of the three-dimensional structure, their product having to be close to and if possible slightly greater than this volume (the volume of the reservoir therefore corresponding to the volume of material needed to form the structure). Advantageously, the thickness is greater than 1%, preferably 5% and more preferably 10% of the thickness of the sheet. It is recommended that this reduction remain less than 50%, preferably 30% and more preferably 20% of the thickness of the sheet. For a sheet with a thickness of 2 mm, the thickness of the protuberance will ideally be between 0.2 and 0.4 mm, giving locally a sheet thickness of between 1.6 and 1.8 mm. The process according to the invention is suitable for moulding sheets having thicknesess that vary widely, for example between 0.5 and 10 mm. The process is however particularly advantageous for moulding thin sheets, having a thickness of less than 5 mm, preferably less than 4 mm. It is especially suitable for sheets having a total thickness of between 2 and 3 mm. The negatives are provided, in a known manner, with air venting systems.

In a second preferred version of the process according to the invention, the three-dimensional structure is projecting and the surface of the mould possesses a protuberance that can be retracted when the mould closes, the protuberance locally increasing the area of the blank sheet, thereby providing material for producing the projecting structure. This retractable protuberance may for example be mounted on a spring. When the mould is open, the protuberance raises the blank sheet near the negative. This results in an excess area of blank sheet, corresponding to the flanks of the raised region. When the mould is closed, the spring is compressed and the protuberance retracts into the mould. The excess amount of blank sheet serves to fill the negative, without requiring flow of material over a long distance, the retractable protuberance having been placed in the vicinity of the negative. The height of the protuberance is determined so as to supply, approximately and in slight excess, the amount of material needed to form the three-dimensional structure.

The process according to the invention may apply to any material having sufficient fluidity to allow moulding and formation of three-dimensional structures by flow under pressure. If required, this fluidity may be obtained by heating the material.

In one advantageous method of implementing the process, the blank sheet is made of a fluid plastic. The process according to the invention is particularly advantageous when the plastic includes fibres, as in this case it is difficult for the material to flow onto the three-dimensional structures in the known processes. These may be glass fibres or fibres of any inorganic material, but also organic fibres such as cotton or wood fibres. The plastic may be a thermoset or a thermoplastic. Preferably it is a thermoplastic, for example a polyolefin such as polypropylene. The precise choice of the material will depend on the fluidity needed to form the three-dimensional structures properly and also, for example, on the final coating of the sheet, in order to bond properly thereto. In this case, the required fluidity may be easily obtained by heating the material to above its softening temperature. In this method of implementation, the mould is cooled down to a temperature below this softening temperature, so as to demould a part having good mechanical properties. It is recommended to employ any means for preventing inhomogeneous and premature cooling of the blank sheet before the mould is closed, for example by means of radiation or circulation of hot air.

The process according to the invention may be used for moulding structured sheets having three-dimensional structures on both its faces. However, in one particularly advantageous version, the sheet possesses a three-dimensional structure only on one of its faces. In this version, when the blank sheet is made of a fluid plastic, it is advantageous for that face intended to remain smooth to be covered with a layer of fibres so as to improve its mechanical integrity, and therefore to make it easier to handle and to reduce the risk of the plastic sticking to the equipment. Moreover, in this version, the process according to the invention makes it possible to obtain a smooth face, free of surface flaws. This is especially advantageous when the three-dimensional structures are deep, as in this case the known processes do not allow a smooth sheet "back", free of sink marks, to be obtained. This advantage of the process according to the invention is even more pronounced when the material is a crystalline polymer, the shrinkage of which as it crystallizes causes, in a known manner, sink marks on the reverse side of large ribs or overthicknesses. In this version, the excellent surface finish of the face not having a three-dimensional structure allows it to be coated with a thin flexible layer, conforming to the surface finish of the sheet, the coating being for example for cosmetic purposes. The coating may for example be fabrics, sheets of plastics, such as flexible PVC, or leather. This coating may be advantageously produced during moulding of the sheet.

Consequently, in one method of implementing this version, before the mould is closed, a flexible coating is superposed on that face of the blank sheet intended to remain smooth.

In this method of implementation, it is advantageous to place a layer of fibres between the blank sheet and the coating, so as to avoid any deformation of the surface finish of the coating during moulding. It is recommended that the layer of fibres be a fibrous fabric formed from cotton fibres or glass fibres.

In the process according to the invention, a mould having a particular internal surface feature, providing a material reservoir function around the negatives of the three-dimensional structures, is used.

Consequently, the invention also relates to a mould for moulding sheets possessing, locally, a three-dimensional projecting or recessed structure, comprising a negative of said three-dimensional structure, at least one portion of the surface of the mould surrounding said negative possessing a feature intended to form a local reservoir able to supply or receive material of the three-dimensional structure depending on whether it is projecting or recessed, respectively.

According to a recommended version of the mould according to the invention, the three-dimensional structure is projecting and the feature of the mould is a protuberance intended to locally reduce the space left between the two parts of the mould when it is closed, in order to force the material to penetrate into the negative and form the three-dimensional structure.

It is also advantageous in the mould according to the invention for the three-dimensional structure to be projecting and the surface of the mould to possess a protuberance that can retract when the mould closes, the protuberance locally increasing the area of the blank sheet, thereby providing material for producing the projecting structure.

Particular aspects of the invention will emerge from the following description of the appended figures.

FIG. 1 illustrates the negatives (2) of the mould and processes according to the invention, and the protuberance (1) of a preferred version.

Figure 2:
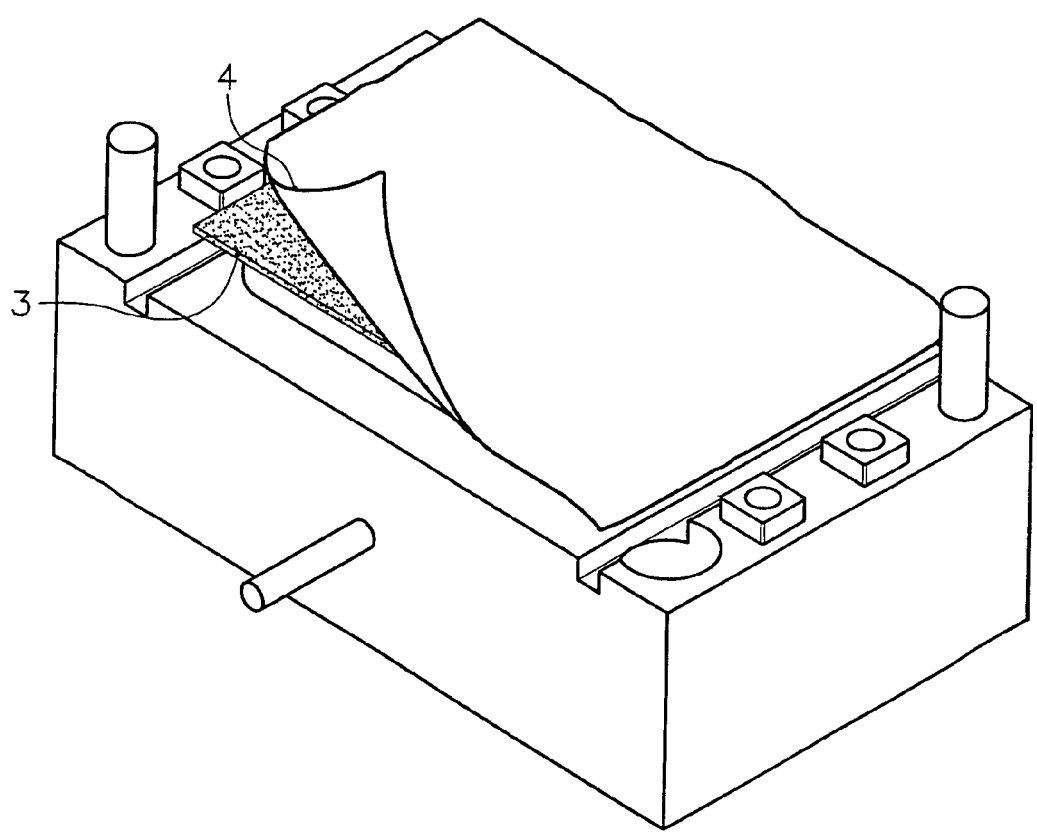
Figure 3:
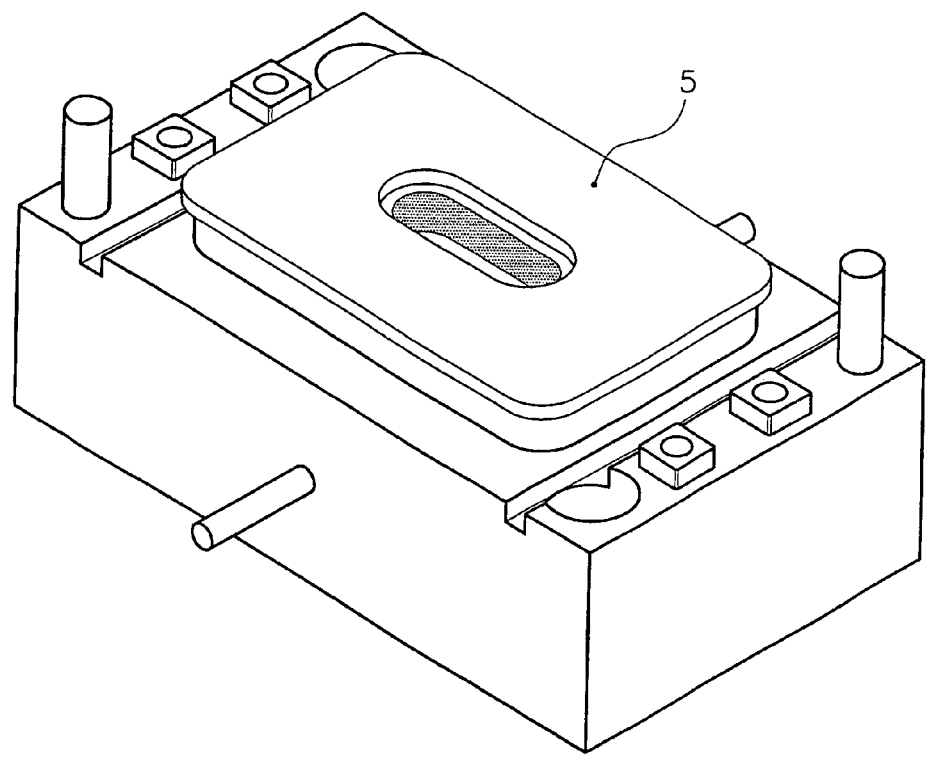
Figure 4:
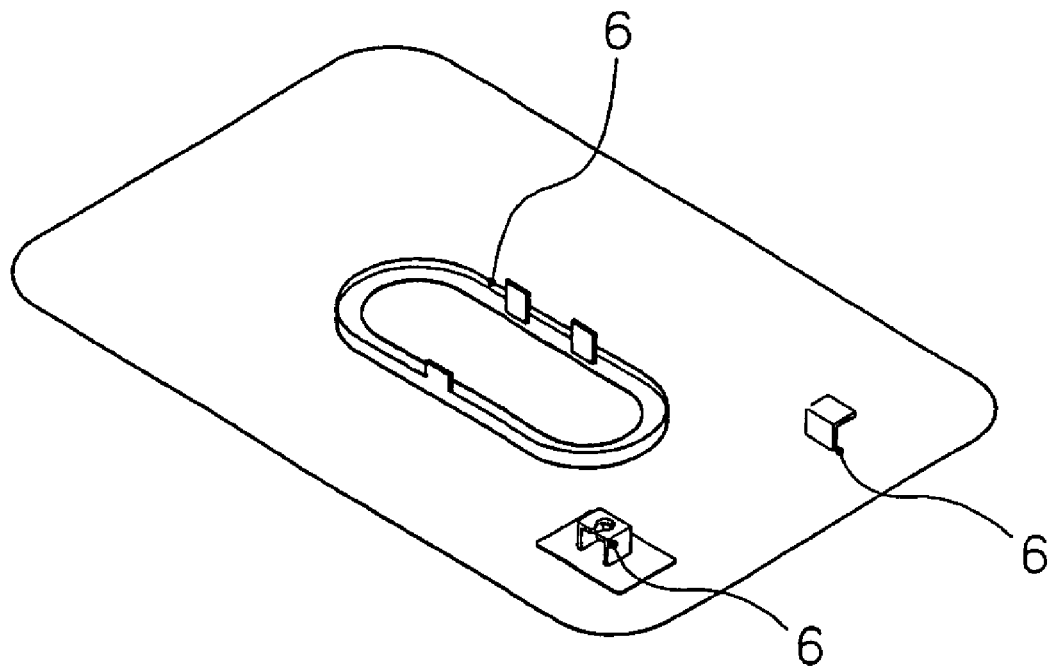

In FIGS. 2 to 4 may be seen a glass-fibre fabric placed between the blank sheet made of wood-fibre-filled polypropylene and the flexible PVC coating (4), the smooth face (5) containing no three-dimensional structure, and the three-dimensional structures (6) located on the other face.

Figure 5A:
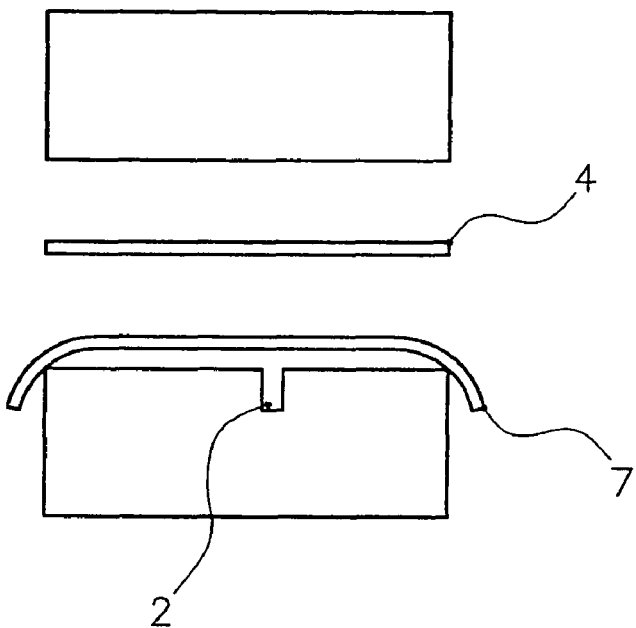
FIG. 5 shows, at 5a, a known moulding process and at 5b a preferred version of the process and of the mould according to the invention.
Figure 5B:
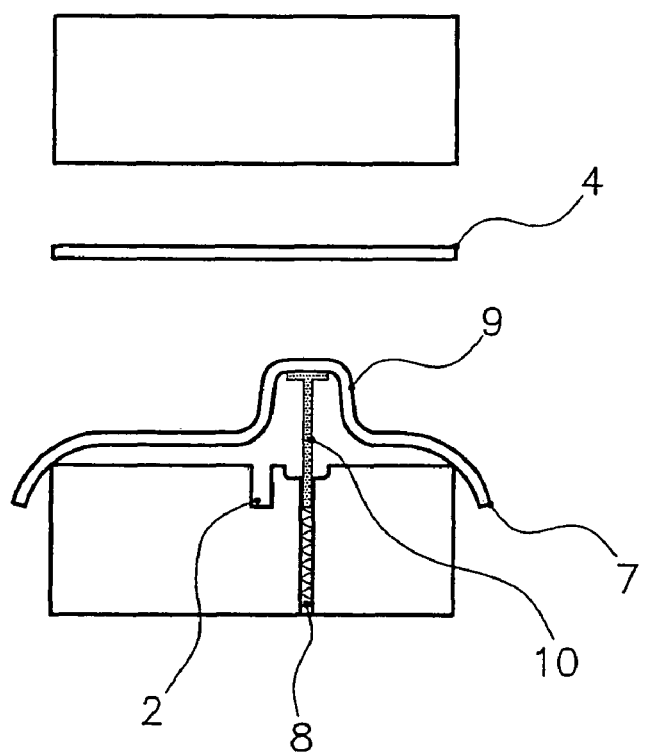

FIG. 5 shows the coating (4), the blank sheet (7), the retractable protuberance (10) and the negative (2) of the three-dimensional structure. FIG. 5b shows that the retractable protuberance, actuated by the spring (8), causes the appearance of flanks (9) on the blank sheet (7), thereby constituting a supply of material for filling the negative (2).

The following example serves to illustrate the invention.

EXAMPLE

Figure 1:
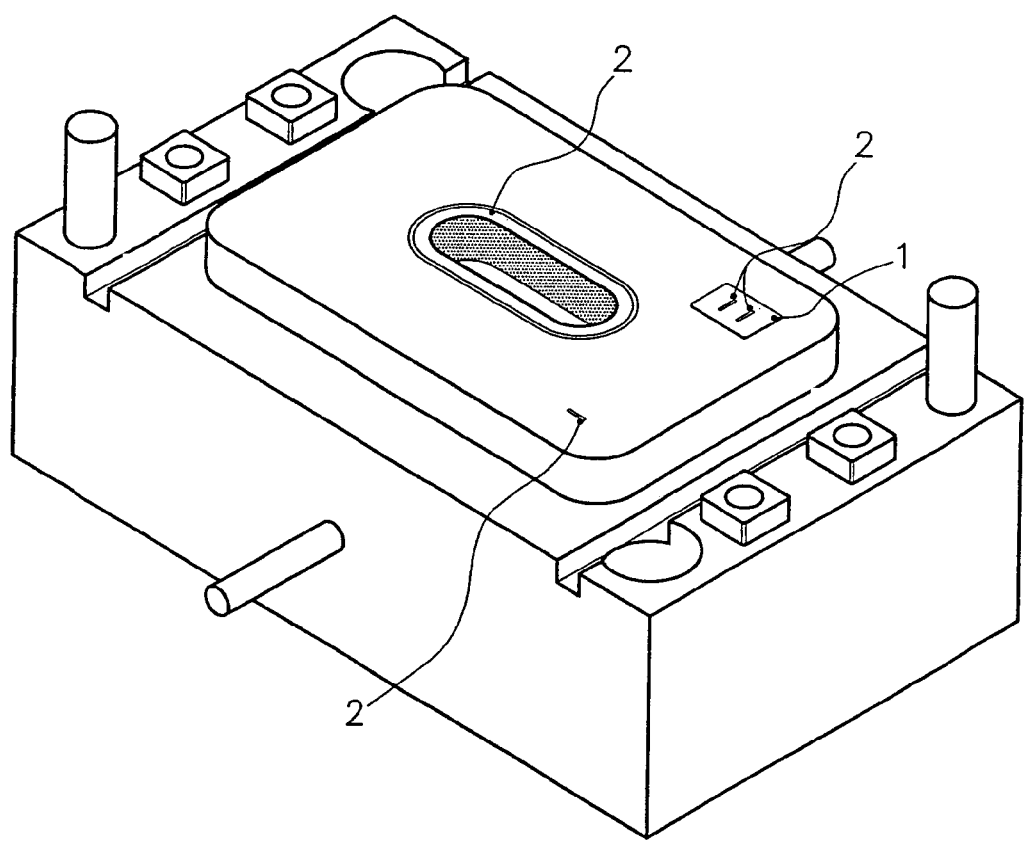
FIGS. 1 to 4 are diagrams illustrating various aspects of the process and the mould according to the invention.

A sheet of polypropylene (BP, HCW, MFI 20 with the dimensions of 2.5×250×250 mm) filled with 30% of wood fibres, covered with a fabric of polypropylene and kenaf fibres having a thickness of 1.5 mm and a relative density of 1.06, was taken and placed over the mould illustrated in FIG. 1. Around the negative (2), the mould has a protuberance (1) with a thickness of 0.5 mm. A coating, consisting of flexible PVC, having a density of 1200 g/m$^2$, was placed on top of the glass-fibre fabric. The blank sheet was preheated to a temperature of 210° C. The mould was kept at a temperature of 50° C. by means of the circulation of a conditioning fluid. The mould was then closed, exerting a force of 60 tonnes for a time of 30 seconds. After the mould was opened, a sheet having three-dimensional structures (6) illustrated in FIG. 4 was obtained.

What is claimed is:

1. A process for molding to produce sheets having a three-dimensional projecting or recessed structure, the process comprising: placing a blank sheet comprising a softened resin between the two parts of a mold, a surface of a mold cavity having a negative structure corresponding to said three-dimensional structure, and closing the mold to compress the blank sheet and force the softened resin to flow into the negative structure, wherein at least one portion of the surface of the mold in a vicinity of said negative structure possesses a feature protruding into the mold cavity; wherein said feature is configured to generate a local supply of resin into the negative structure when the mold is being closed; wherein the feature is configured to slidably protrude or retract into the mold cavity when the mold closes; and further comprising the step of causing the retractable protuberance to cause an area of the blank sheet to be enclosed within the two parts of the mold, that is larger than said negative structure; thereby providing material which is forced into the negative structure for producing the projecting structure when the mold is being closed.

2. The process according to claim 1, wherein the three-dimensional structure is projecting and the feature of the mold is a protuberance intended to locally reduce a space provided between the two parts of the mold when the mold is closed, in order to force the material to penetrate into the negative structure and to form the three-dimensional structure.

3. The process according to claim 1, wherein the blank sheet is made of a softened plastic.

4. The process according to claim 3, wherein the fluid plastic is a thermoplastic that has been preheated to above its softening point, and wherein the mold is conditioned at a temperature below the softening point.

5. The process according to claim 1, wherein the three-dimensional structure is provided only on one face of the sheet.

6. The process according to claim 5, wherein, before the mold is closed, a flexible coating is superposed on that face of the blank sheet intended to remain smooth.

7. The process according to the claim 6, wherein a layer of fibers is placed between the sheet and the coating.

8. The process according to the claim 7, wherein the layer of fibers is a fibrous fabric.

* * * * *

UNITED STATES PATENT AND TRADEMARK OFFICE
CERTIFICATE OF CORRECTION

| | | |
|---|---|---|
| PATENT NO. | : 7,794,642 B2 | Page 1 of 1 |
| APPLICATION NO. | : 11/914134 | |
| DATED | : September 14, 2010 | |
| INVENTOR(S) | : Giorgio Venere and Adriano Odino | |

It is certified that error appears in the above-identified patent and that said Letters Patent is hereby corrected as shown below:

Title page, Item (73): Change -- Burlasco -- to -- Buriasco --

Signed and Sealed this
Twenty-fifth Day of January, 2011

David J. Kappos
*Director of the United States Patent and Trademark Office*